(12) United States Patent
Kanao

(10) Patent No.: US 6,724,132 B2
(45) Date of Patent: Apr. 20, 2004

(54) SPARK PLUG FOR AN ENGINE FOR A COGENERATION SYSTEM

(75) Inventor: Keiji Kanao, Aichi-ken (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/893,422

(22) Filed: Jun. 29, 2001

(65) Prior Publication Data
US 2002/0021066 A1 Feb. 21, 2002

(30) Foreign Application Priority Data

Jun. 29, 2000 (JP) ........................... 2000-196970
May 9, 2001 (JP) ........................... 2001-139246

(51) Int. Cl.$^7$ ............................................. H01T 13/20
(52) U.S. Cl. .................. 313/141; 313/142; 313/144; 123/169 R; 123/169 EL
(58) Field of Search ................... 313/141, 142, 313/144; 123/169 R, 169 EL; 445/7

(56) References Cited

U.S. PATENT DOCUMENTS

| | | | |
|---|---|---|---|
| 4,700,103 A | * | 10/1987 | Yamaguchi et al. ........ 313/141 |
| 5,369,328 A | | 11/1994 | Gruber et al. |
| 6,094,000 A | * | 7/2000 | Osamura et al. ............ 313/141 |
| 6,215,234 B1 | * | 4/2001 | Abe et al. .................... 313/141 |

FOREIGN PATENT DOCUMENTS

| JP | 7-37675 | | 2/1995 | |
|---|---|---|---|---|
| JP | 8-298178 | | 11/1996 | |
| JP | 9-7734 | * | 1/1997 | ........... H01T/13/20 |

* cited by examiner

Primary Examiner—Nimeshkumar D. Patel
Assistant Examiner—Sharlene Leurig
(74) Attorney, Agent, or Firm—Nixon & Vanderhye P.C.

(57) ABSTRACT

In a side ground electrode type of spark plug, sizes of discharge members are optimized to reduce a useless portion in discharging to improve discharge wear resistance. A first discharge member mainly comprising Ir alloy is welded to the central electrode. A second discharge member comprising Ir metal circle plate is welded to the ground electrode, wherein a side surface of the first discharge member confronts a surface of the second discharge member to form a spark discharge gap $G \geq 0.2$ mm, D(a width of the first discharge member)$\geq 1.6$ mm. $|A-D| \leq (G+0.5$ mm). A is a width of the second discharge member. Moreover, $D \leq 5.0$ mm. A maximum cross-sectional area of weld portion between the first discharge member and the central electrode $\leq 8$ mm$^2$. This weld portion has distance L to the second discharge member. $L \geq G$.

7 Claims, 7 Drawing Sheets

SPARK PLUG FOR AN ENGINE FOR A COGENERATION SYSTEM

BACKGROUND OF THE INVENTION

1. Field of the Invention

This invention relates to a spark plug for an engine for a cogeneration system.

2. Description of the Prior Art

In the gas engine in a cogeneration system, fuel is ignited with a spark plug. In this spark plug, the heat load to the electrode is greater than that to the spark plug for automobile engines because the engine for the cogeneration system is required to continuously run.

U.S. Pat. No. 5,369,328 discloses a spark plug for cogeneration comprising ground electrodes confronting each other, and a central electrode arranged between the ground electrodes. The central electrode has a prism-shaped attachment portion which is square in plan view and which comprises a platinum-rhodium alloy. The prism-shaped attachment portions carried by a pin-shaped part of the center electrode which projects into a central opening in the attachment portion and is welded or soldered or brazed thereto at the top surface of the prism-shaped portion. As a result, the weld portion is subject to affection of the heat from the combustion gas. Therefore, the weld portion that is derived from melted platinum-rhodium alloy and the material of the central electrode cannot resist the heat load for long interval, so that there is considerable wear at that portion.

SUMMARY OF THE INVENTION

The aim of the present invention is to provide a superior spark plug.

According to the present invention, a first aspect of the present invention provides a spark plug for a cogeneration engine comprising: a tubular housing; a central bar electrode supported by said tubular housing in said tubular housing with electrical insulation therebetween; a first bar discharge member being arranged at one end of said central bar electrode, comprising Ir alloy, and protruding from one end of said tubular housing along an axis of said center electrode; a plate ground electrode being arranged at said one end of said tubular housing in a radial direction of said axis and having one end surface confronting a side surface of said first bar discharge member; and a second discharge member being arranged on said end surface and having a surface confronting said side surface, spark discharge being generated at a gap between said first and second discharge members, wherein if it is assumed that a distance of said gap is G, a width of said side surface in a normal direction of a plane including said radial direction and said axis is D, and a width of said surface in said normal direction is A, G is equal to or greater than 0.2 mm and equal to or lower than 0.6 mm, D is equal to or greater than 1.6 mm, $|A-D|$ is equal to or lower than a result of adding 0.5 mm to G.

According to the present invention, a second aspect of the present invention provides a spark plug based on the first aspect, wherein D is equal to or lower than 5.0 mm.

According to the present invention, a third aspect of the present invention provides a spark plug based on the first aspect further comprises a weld portion between said one end of said central electrode and said first bar discharge member, wherein a maximum cross-sectional area of said weld portion on a plane perpendicular to said axis is equal to or lower than 8 mm$^2$.

According to the present invention, a fourth aspect of the present invention provides a spark plug based on the first aspect, wherein said one end of said central electrode is welded to a surface of said first bar discharge member on the side of said central electrode.

According to the present invention, a fifth aspect of the present invention provides a spark plug based on the first aspect, said spark plug further comprises a weld portion between said one end of said central electrode and said first bar discharge member, said weld portion being provided by laser welding, wherein said weld portion does not confront said surface of said second discharge member, if it is assumed that a shortest distance between said weld portion and said second discharge member is L, L is equal to or greater than G.

According to the present invention, a sixth aspect of the present invention provides a spark plug based on the fifth aspect, wherein L is equal to or greater than a result of adding 0.2 mm to G.

According to the present invention, a seventh aspect of the present invention provides a spark plug based on the first aspect, wherein each of said first and second discharge members comprises Ir and at least one of Rh, Pt, Ru, Pd, and W.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
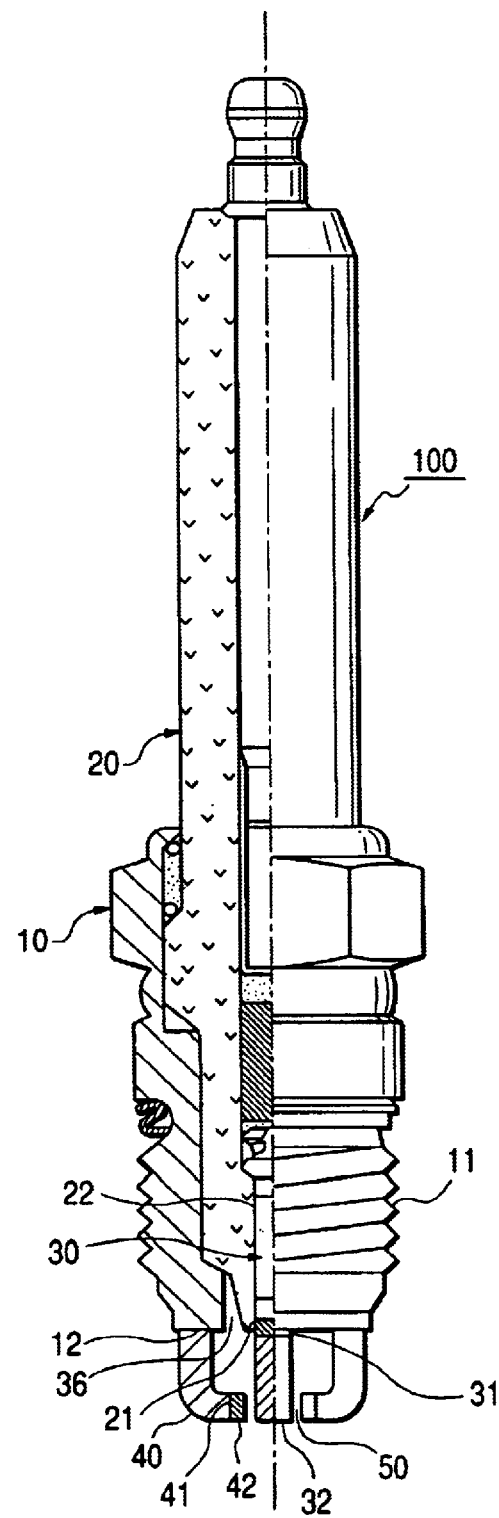
FIG. 1 shows a side elevation view, partly in cross section, of a side electrode type of spark plug according to the invention.

The spark plug according to this embodiment is used for a gas engine for an electric generator in a cogeneration system for example. FIG. 1 shows a side elevation view, partly in cross section, of a side electrode type of spark plug 100 according to the invention. The side electrode type of spark plugs have a central electrode 30 and a ground electrode 40 arranged on the side of the central electrode 30, wherein spark discharge occurs across their gap extending in a substantially perpendicular direction to the axis of the central electrode 30.

Figure 2A:
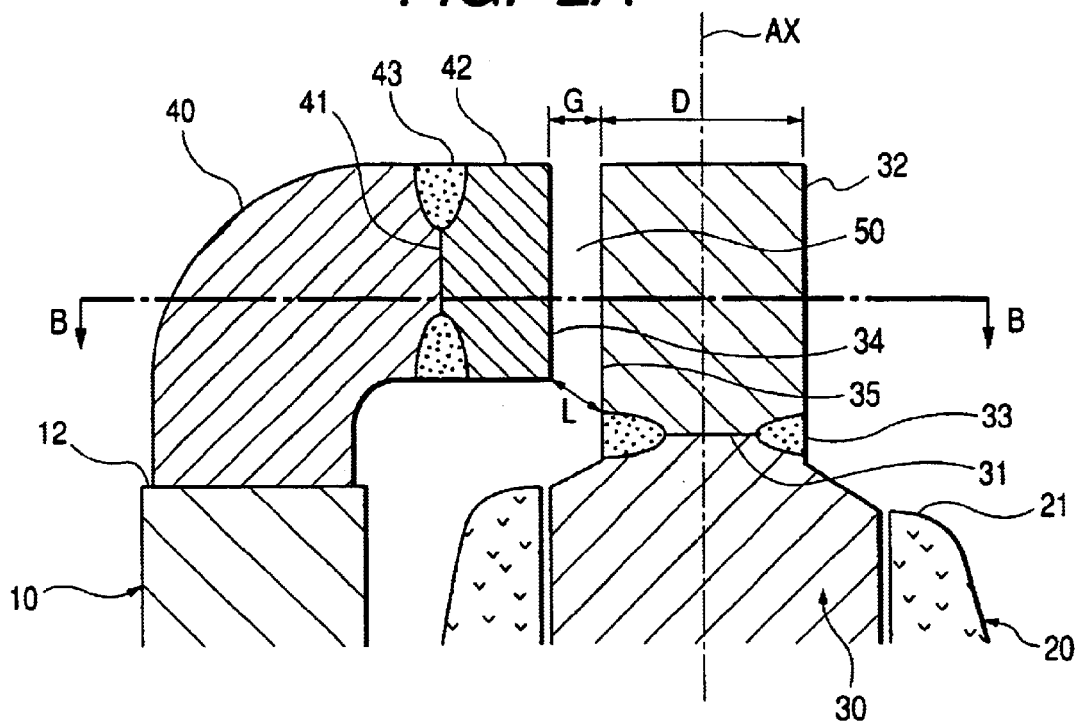
FIG. 2A shows an enlarge side elevational view in cross section of a spark discharging portion.
Figure 2B:
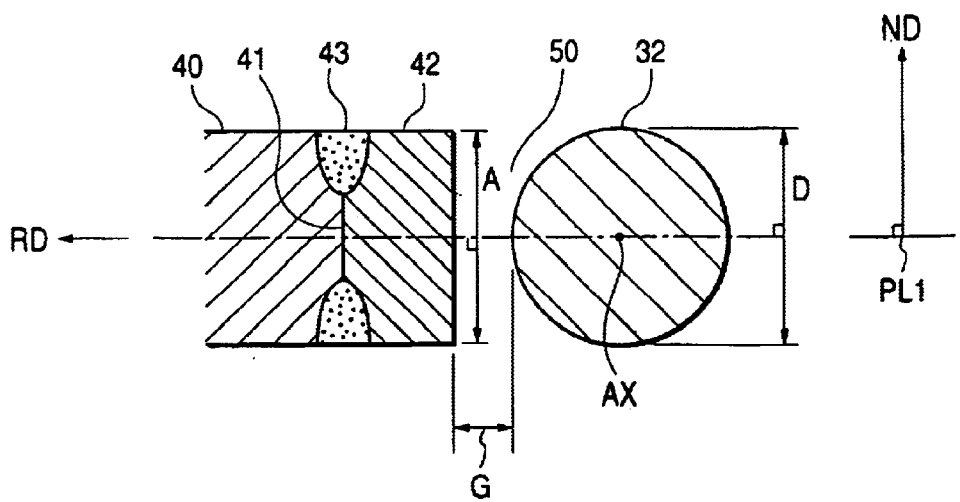
FIG. 2B shows a section taken on line B—B in FIG. 2A.

FIG. 2A shows an enlarged side elevational view in cross section of a spark discharging portion and FIG. 2B shows a section taken on line B—B in FIG. 2A.

The spark plug 100 includes a tubular metal housing 10 having an inner hole 36 therein and has a thread portion 11 for mounting on an engine block (not shown). The housing 10 supports an insulator 20 made of alumina ceramics ($Al_2O_3$) or the like in the inner hole 36 of the housing 10. A tip 21 of the insulator is exposed to the space at one end 12 of the housing 10.

The insulator 20 supports the central electrode 30 in an axial hole 22 thereof, so that the housing 10 supports the central electrode 30 with insulation. A tip 31 of the central electrode 30 is exposed to the space at one end 12 of the housing 10 before welding. The central electrode 30 includes an inner material and an outer material around the inner material. The inner material includes a metallic material having a superior heat conductivity such as Cu. The outer material includes a metallic material having a superior heat resistance and a superior corrosion resistance such as Ni group alloy. In this embodiment, the central electrode 30 has a cylindrical shape.

At the tip 31 of the central electrode 30, a first discharge member 32 having a bar shape comprising Ir alloy is provided with agreement of the axis AX of the first discharge member 32 with the axis of the central electrode 30. The first discharge member 32 protrudes from one end 12 of the housing 10 along the axis AX of the first discharge member 32 and the central electrode 30. In this embodiment, the first discharge member 32 has a bar shape (cylindrical shape) having a circular cross sectional area, and the tip 31 of the central electrode 30 is welded to a surface of the first discharge member 32 on the side of the central electrode 30 by means of laser welding, so that a weld (alloy) portion 33 in which materials of the central electrode 30 and first discharge member 32 are melted, alloyed with each other, and hardened. The weld portion 33 does not confront a surface of the second discharge member 42 mentioned later.

At the one end 12 of the housing 10, two ground electrodes 40 are fixed to the housing 10 by means of welding or the like in a radial direction RD of the axis AX. These ground electrodes 40 includes a Ni alloy or Fe alloy or the like. In this embodiment, the ground electrode 40 has a post shape of which section is rectangular. An end (end surface) 41 of the ground electrode 40 opposite to one end 12 of the housing 10 confronts the side surface 35 of the first discharge member 32. These ground electrodes 40 are arranged at the opposite positions on the circular shape of the end 12, so that the first discharge member 32 on the central electrode 30 is arranged between these ground electrodes 40 with spark gaps 50.

At the end 41 of the ground electrode 40, a second discharge member 42 has a plate shape including Ir alloy and is arranged with its surface confronting a side surface 35 of the first discharge member 32. In this embodiment, the second discharge member 42 comprises a circular plate and welded to the end surface 41 of the ground electrode 40 by laser welding with the weld portion 43 being formed in which both materials of the ground electrode 40 and the second discharge member 42 are melted, alloyed, and hardened so that the ground electrode 40 is connected to the second discharge member 42.

Each of the first and second discharge members 32 and 42 mainly includes Ir and at least one of Rh (rhodium), Pt, Ru (ruthenium), Pd (palladium), and W(tungsten) is added thereto. In this embodiment, each of the first and second discharge members 32 and 42 includes Ir alloy including 90% Ir and 10% Rh by weight (hereinafter, this alloy is referred to as Ir-l0Rh).

In the side electrode type of the spark plug 100 according to this embodiment, sizes at the first and second discharge members 32 and 42 and the spark discharge gaps 50 are determined as follows:

As shown in FIGS. 2A and 2B, it is assumed that the distance of the spark gap is G, a width of the side surface confronting the second discharge member 42 surface (in a normal direction ND of a plane PL1 including said radial direction RD and said axis AX) is D, a width of the surface of the second discharge member 42 confronting the first discharge member 32 in the normal direction ND is A. In this embodiment the width D agrees with a diameter of the first discharge member 32 and the width A agrees with a diameter of the second discharge member 42 of which shape is circular plate.

The distance G of the gap is equal to or greater than 0.2 mm and equal to or lower than 0.6 mm. The width D is equal to or greater than 1.6 mm and is equal to or lower than the result of adding 0.5 mm to an absolute value |A–D|. The reason for setting the distance G of the gap to 0.2 mm≦G≦0.6 mm is to prevent misfire. This is because the spark plug 100 for cogeneration requires a high discharge voltage and thus, this range is provided to satisfy this requirement with stable operation without misfire.

Moreover, D≧1.6 mm is determined from the experimental result made by the inventor. In operation of the plug 100, sparks are developed across the gap G, that is, between the side surface 35 of the first discharge member 32 and the surface 34 of the second discharge member 42. Accordingly, both of the surface 34 and the side surface 35 become worn and thus, the gap G becomes greater than the initial value gradually.

For example, it is judged that there is an actual wear resistance if a test is made under the condition that the spark plug 100 is continuously operated in a usual condition for 2000 hours, and if the difference between the initial value and the value after the test in the gap G is equal to or lower than 0.3 mm. In other words, if the difference between the initial value and the value after the test in the gap G is greater than 0.3 mm, the misfire will occur. According to the wear resistance test, the inventor discovered that the width D of the first discharge member 32 is required to be equal to or greater than 1.6 mm that is greater than the conventional value to suppress the wear on the side surface 35 of the first discharge member 32 to prevent misfire.

However, in the spark plugs for cogeneration of which outer diameter at the mounting screw portion 11 of the housing 10 is generally from 14 to 18 mm, the width D of the first discharge member 32 should be made lower than 5.0 mm. This is because it is difficult to contain the ground electrode 40 within the outer diameter of the mounting screw portion 11 if the width D of the first discharge member 32 is made greater than 5.0 mm.

Moreover, in the case that the tip 31 of the central electrode 30 is welded to the first discharge member 32 by laser welding as described above, if the maximum sectional area (connecting area) of welding portion 33 on a plane PL2 perpendicular to the axis AX is grater than 8 $mm^2$, heat stress at the welding portions becomes large, so that cracks will occur. Accordingly, there is possibility that the first discharge member 32 may be disconnected from the central electrode 30. Then, to favorably keep the connection between the tip 31 of the central electrode 30 and the first discharge member 32, it is desirable that 1.6 mm≦D≦5.0 mm and the maximum sectional area at the soldering portion 33 is equal to or lower than 8 mm².

Figure 3A:
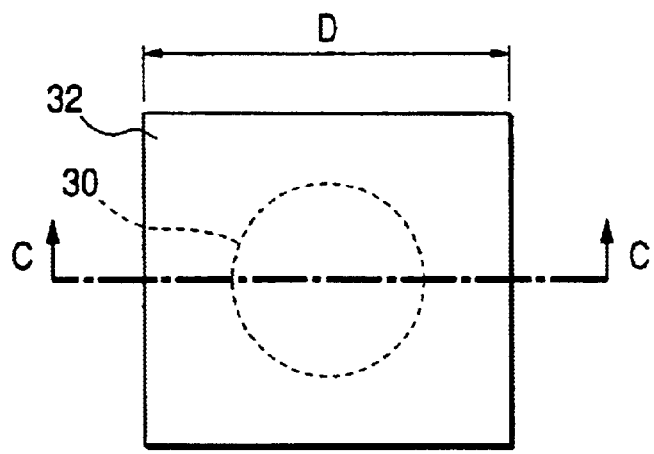
FIG. 3A shows a plan view of another example of the first discharge member.
Figure 3B:
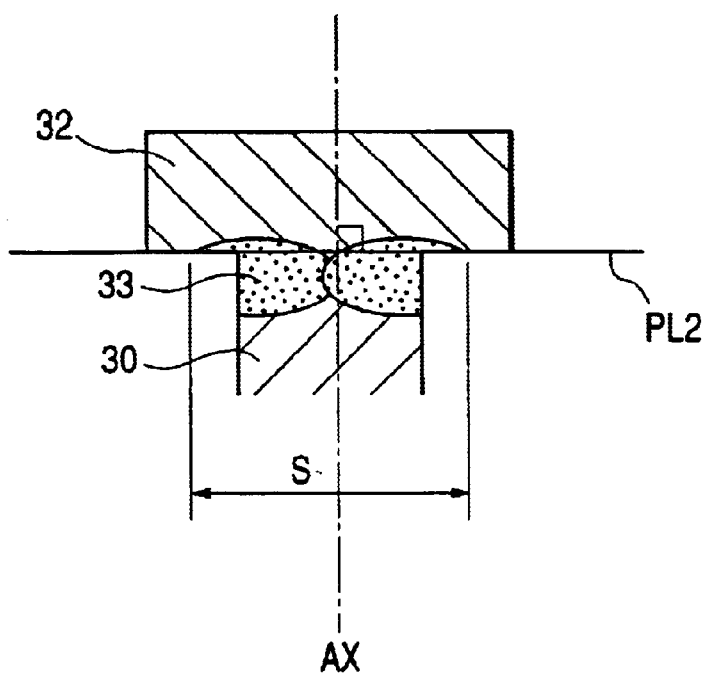
FIG. 3B is a sectional side elevational view taken on the line C—C in FIG. 3A.

To provide further improved wear resistance and connection between the first discharge member 32 and the central electrode 30, another example of the first discharge member 32 and the central electrode 30 are shown in FIGS. 3A and 3B. FIG. 3A shows a plan view of another example of the first discharge member 32 and FIG. 3B is a sectional side elevational view taken on the line C—C.

As shown in FIGS. 3A and 3B, the rectangular shape on the cross section perpendicular to the axis AX makes the width D of the first discharge electrode member 32 as larger as possible within the maximum size of 5.0 mm. Accordingly, the lifetime of the spark plug 100 is improved.

On the other hand, the diameter of the central electrode 30 is made lower than the width D of the first discharge electrode 32, and the central electrode 30 is connected to the surface of the first discharge member 32 on the side of the center electrode 30 by laser welding with the weld portion 33 in which both materials of the central electrode 30 and the first discharge member 32 were melted and mixed as alloy. Accordingly, the maximum section at the alloy portion 33 on the plane PL2 perpendicular to the axis AX is made lower than 8 mm² to reduce the heat stress at the weld portion 33 to provide favorable connection.

Moreover, the inventor experimentally discovered that it is favorable to make the absolute |A–D| equal to or lower than the result of adding 0.5 mm to the gap G from studying the relation between the sizes of the first and second discharge members 32 and 42 and the range of spark discharge (discharge width T in the normal direction ND on the surface of the second discharge member 42). An example will be described.

Figure 4A:
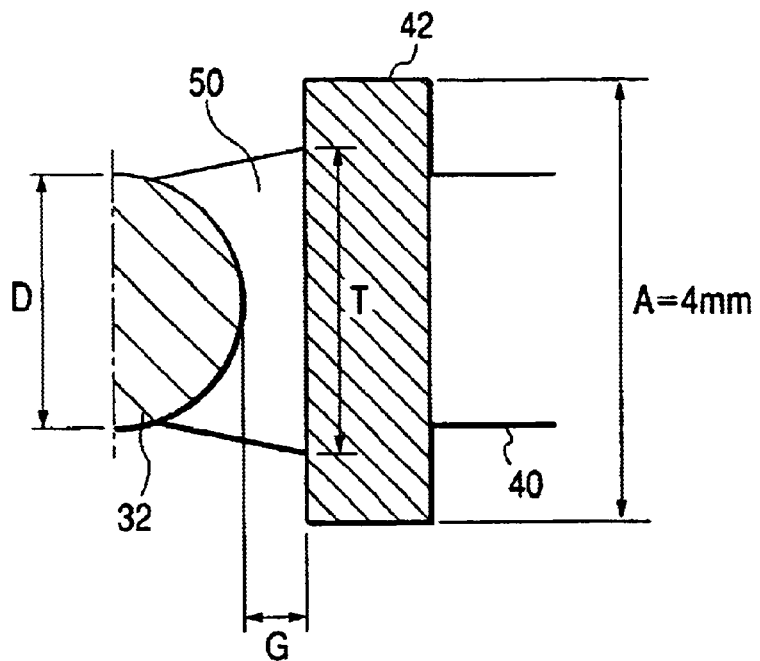
FIGS. 4A and 4B are cross-sectional plan views of examples of the first and second discharge members.

In this example, Ir-10 Rh is used for the first and second discharge members 32 and 42 and 1.6 mm≦D≦2.4 mm, and 0.2 mm≦G≦0.6 mm and as shown in FIG. 4A, a circle plate of which width (diameter) A is 4 mm, which is rather large, is used for the second discharge member 42. This spark plug 100 is mounted on a chamber in which pressure is increased to 0.6 MPa, and spark discharge is developed.

Then, the spark discharge occurs at the range radially extending from the side surface of the first discharge member 32 to the surface of the second discharge member 42. At the surface of the second discharge member 42, the discharge width T represents the discharge range on the surface.

Figure 5:
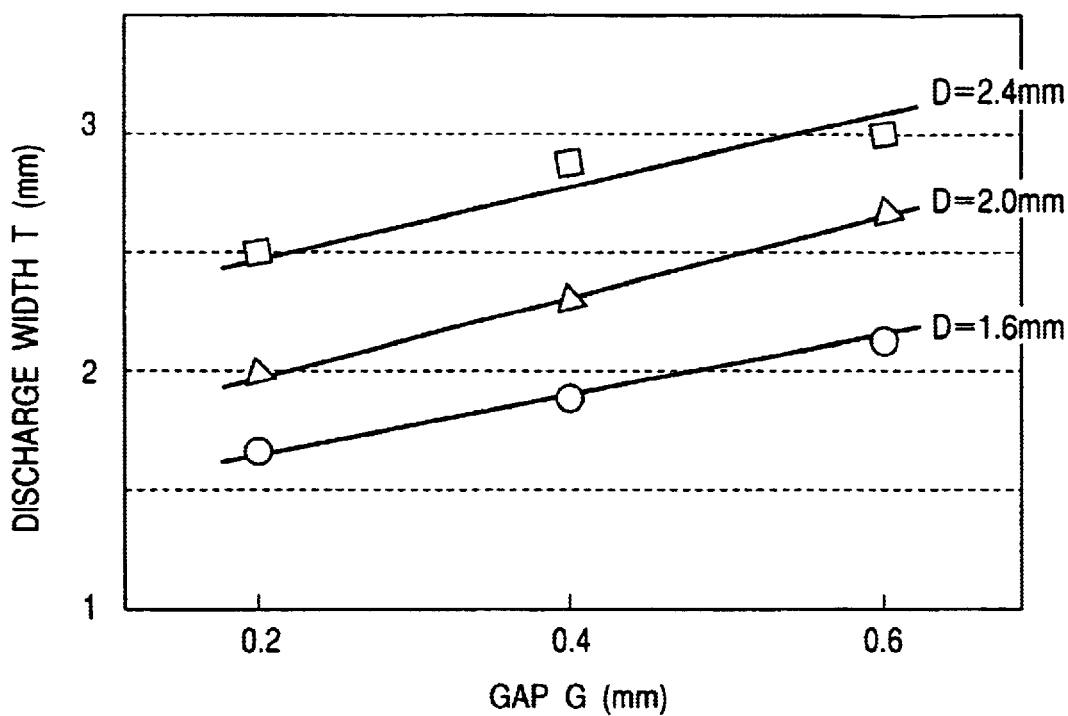
FIG. 5 is a graphical drawing showing the relation between the discharge width T and the gap G with the width D being varied.

FIG. 5 is a graphical drawing showing the relation between the discharge width T and the gap G with the width D being varied. In the drawing, ○ represents the variation of the discharge width T with the width D of 1.6 mm, Δ represents the variation of the discharge width T with the width D of 2.0 mm, and □ represents the variation of the discharge width T with the width D of 2.4 mm.

As shown in FIG. 5, there is the tendency that the discharge width T is substantially equal to the result of adding the width D of the first discharge member 32 to the distance G of the spark discharge gap 50. That is, there is a relation of T≈D+G. Accordingly, if the width A of the second discharge member 42 is lower than (D+G), the area outside the discharge width T, that is, the area which does not contribute the spark discharging, can be eliminated. Hence, to make the lifetime longer with a larger width A, it is favorable that the width A is equal to (D+G).

Figure 4B:
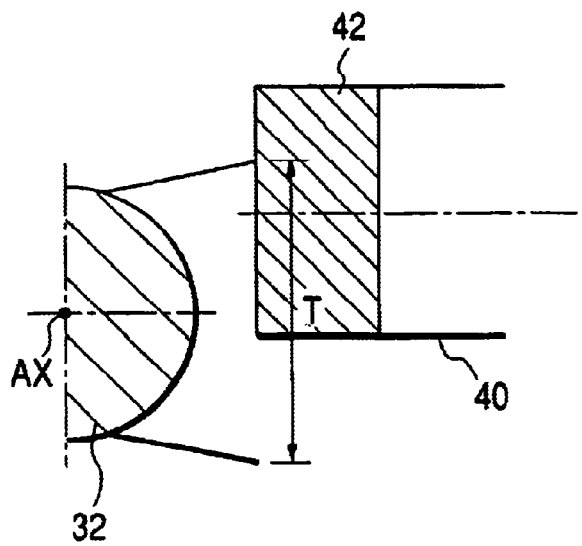

Moreover, the first and second discharge members 32 and 42 may be dislocated from the correct locations due to dispersion in manufacturing process. For example, if the second discharge member 42 is dislocated from the center axis AX of the first discharge member 32 as shown in FIG. 4B (upwardly in the drawing), all of the surface of the second discharge member 42 is not located at the discharge area T. Accordingly, there is an useless portion though the width A of the second discharge member 42 is made equal to (D+G).

This dislocation is generally within about 0.5 mm, so that the width A of the second discharge member 42 should be equal to or lower than the result of adding 0.5 mm to (D+G). Hence, the relation of A≦D+G+0.5 mm (relation 1) is provided. Accordingly, setting the width A of the second discharge member 42 within the range defined by the relation 1 eliminates the useless portion.

On the contrary to the case shown in FIGS. 4A and 4B, the width A of the second discharge member 42 may be smaller than the width D of the first discharge member 32. In this case, the discharge range T radially expands from the surface of the second discharge member 42 to the side surface of the first discharge member 32. The inventor similarly studied this case, so that the relation of D≦A+G+0.5 mm (relation 2). From the relations (1) and (2), the relation |A–D|≦G+0.5 mm.

As mentioned above, in this embodiment, the sizes of the first and second discharge members 32 and 42 are increased under the condition of 0.2 mm≦G≦0.6 mm and D≧1.6 mm. The spark plug 100 provides a long lifetime as a spark plug for a cogeneration system up to the actual level (for example, continuous running for more than 2000 hours).

Moreover, at first, the first discharge member 32 of which width D is sufficiently increased for long lifetime, and then, the width A of the second discharge member 42 is determined, so that useless portion at the first or second discharge member 32 or 42 can be eliminated substantially with long lifetime.

Moreover, in this embodiment, the tip 31 of the central electrode 30 is connected to the first discharge member 32 by laser welding with the weld portion 33. In this case, as shown in FIG. 2A, if it is assumed that the shortest distance between the weld portion 33 and the second discharge member 42 is L, it is favorable that the shortest distance L is greater than the distance G of the spark discharge gap 50.

The inventor experimentally discovered this relation as a result of studying the relation between the shortest distance L and the undesirable spark discharge to the weld portion 33.

More specifically, the Ir-10 Rh is used for the first and second discharge members 32 and 42. The width D of the first discharge member 32 is 2.0 mm. The width A of the second discharge member 42 is 2.0 mm. In this condition, the shortest distance L is changed with the distances G of 0.2, 0.4, and 0.6 mm. The spark plug 100 is mounted on the chamber in which pressure is increased to 0.6 Mpa, and spark discharge is developed to obtain a ratio of undesirable sparks to the weld portion 33 through observing the discharge condition.

Figure 6:
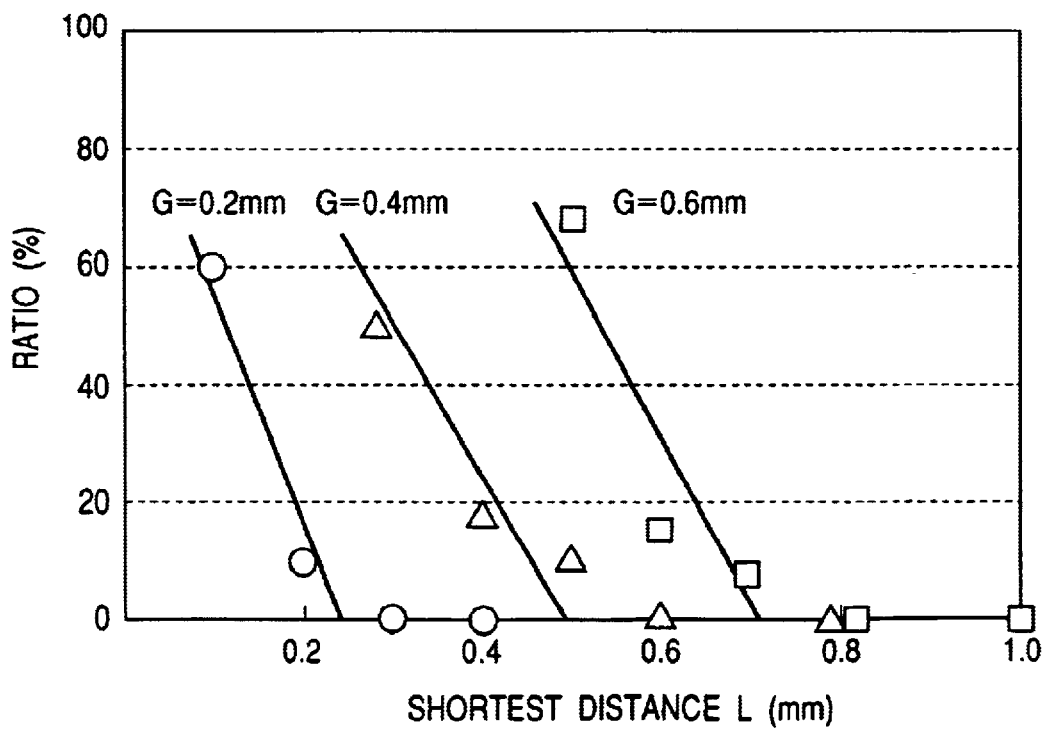
FIG. 6 is a graphical drawing showing the relation between the shortest distance L (mm) and a ratio (%) of undesirable spark to the weld portion.

FIG. 6 is a graphical drawing showing the relation between the shortest distance L (mm) and the ratio (%) of the number of times of undesirable sparks to the weld portion 33 to all the number of sparks. The inventor discovered that the wear at the weld portion 33 can be suppressed to the actual use level by controlling the undesired spark to the weld portion 33 under 20%.

The result shown in FIG. 6 shows that the ratio of the number of times of undesirable sparks to the weld portion 33 can be suppressed under 20%, if the shortest distance L is equal to or greater than 0.2 mm when the distance G of the gap is 0.2 mm (○). Moreover, the ratio can be suppressed under 20%, if the shortest distance L is equal to or greater than 0.4 mm when the distance G of the gap is 0.4 mm (Δ), or if the shortest distance L is equal to or greater than 0.6 mm when the distance G of the gap is 0.6 mm (□). That is, if the shortest distance L is equal to or greater than the distance G of the spark discharge gap 50, the ratio of the undesirable spars to the weld portion 33 can be suppressed fewer than 20%.

Moreover, as can be seen from FIG. 6, if the shortest distance L is equal to or greater than 0.3 mm when the distance G=0.2 mm, all sparks occur between the side surface 35 of the first discharge member 32 and the surface 34 of the second discharge member 42. Further, if the shortest distance L is equal to or greater than 0.6 mm when the distance G=0.4 mm, all sparks occur between the side surface 35 of the first discharge member 32 and the surface 34 of the second discharge member 42. Moreover, if the shortest distance L is equal to or greater than 0.8 mm when the distance G=0.6 mm, all sparks occur between the side surface 35 of the first discharge member 32 and the surface 34 of the second discharge member 42. Thus, spark to the weld portion 33 is prevented.

Accordingly, if L≧G, and more preferably L≧G+0.2 (mm), the probability of occurrence of spark between the weld portion 33 and the second discharge member 42 can be suppressed to reduce the wear at the weld portion 33, so that connection of the central electrode 30 to the first discharge member 32 can be favorably provided.

As mentioned above, according to this embodiment, in the side electrode type of spark plug, the sizes of the first and second discharge members 32 and 42 are increased to provide a longer lifetime. Further, the sizes of the first and second discharge members 32 and 42 are optimized. Hence, a useless portion, which does not contribute to spark discharge in the first and second discharge members 32 and 42 can be eliminated. Further, connection of the first discharge member 32 to the central electrode 30 can be provided favorably.

Modifications

Figure 7A:
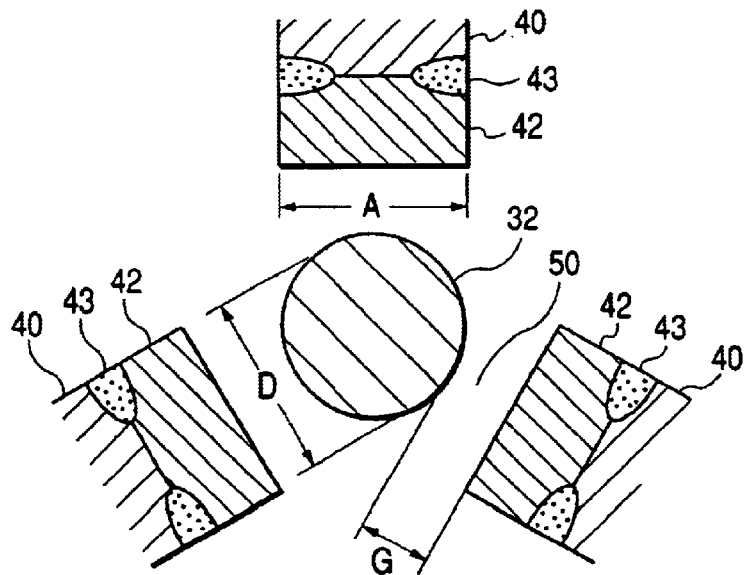
FIGS. 7A, 7B, 8A to 8C show modifications of this embodiment.
Figure 7B:
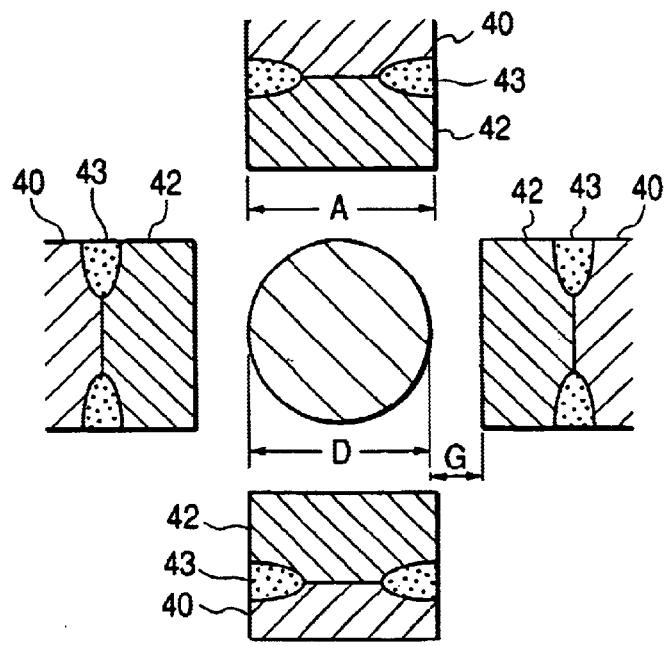

In the spark plug 100 shown in FIG. 1, two ground electrodes 40 are provided. However, the number of the ground electrodes is not limited to this. That is, the number of the ground electrodes may be one or three as shown in FIG. 7A. FIG. 7B shows the spark plug having four ground electrodes.

Figure 8A:
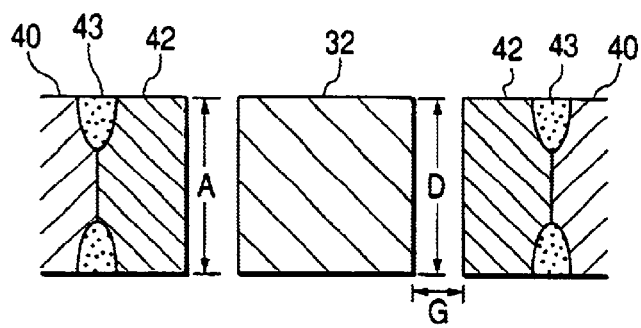
Figure 8B:
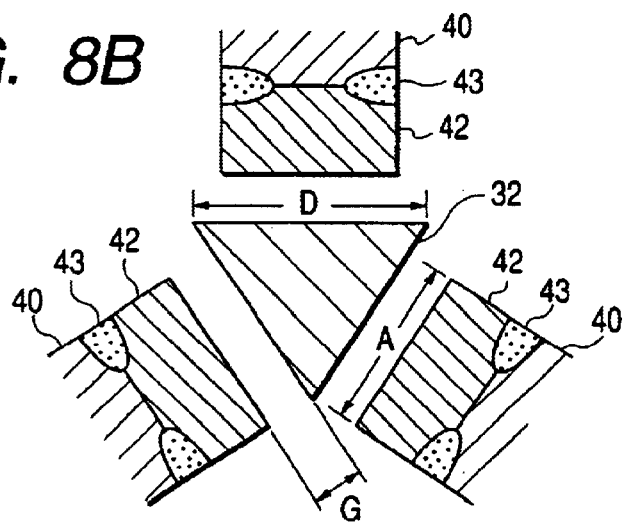
Figure 8C:
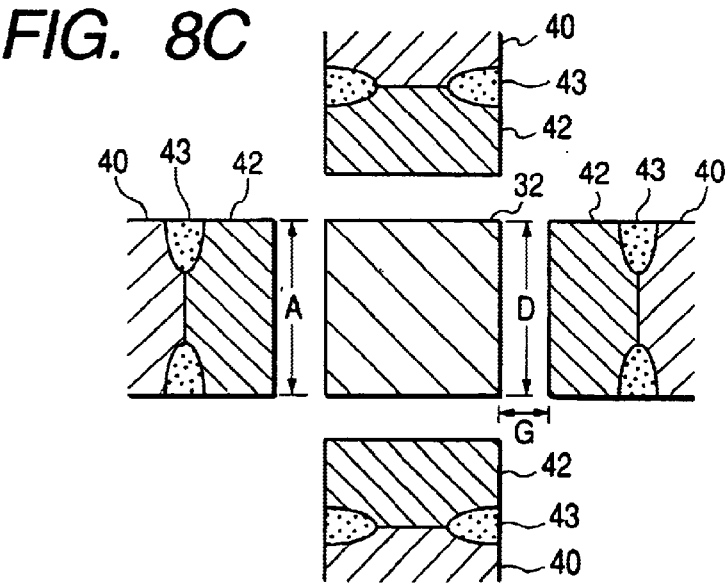

In the spark plug 100 shown in FIG. 1, the cross section of the first discharge member 32 is a circle. However, the shape of the cross section of the first discharge member 32 is not limited to a circle if only the first discharge member 32 is a bar. As shown in FIGS. 8A to 8C, the cross section of the first discharge member 32 may be a substantially rectangular as shown in FIG. 8A, or a triangle as shown in FIG. 8B. Further, as shown in FIG. 8C, the number of the ground electrodes may be four and each ground electrode confronts each side of the rectangular on the cross-sectional view.

Further, in the spark plug 100 shown in FIG. 1, the shape of the second discharge member 42 is a circle plate. However, the second discharge member 42 may have any other shape if only it is a plate. For example, the shape may be an oval, a rectangular plate, or a triangle plate.

Moreover, it is sufficient that the tip of the ground electrode confronts the side surface of the first discharge member, and the shape of the ground electrode is not limited to the L shape. Moreover, connection of the central electrode 30 to the first discharge member 32, and connection of the ground electrode 40 to the second discharge member 42 may be provided with plasma welding.

What is claimed is:

1. A spark plug for a cogeneration engine comprising:

a tubular housing;

a central bar electrode supported by said tubular housing in said tubular housing with electrical insulation therebetween;

a first bar discharge member being arranged at one end of said central bar electrode, comprising Ir alloy, protruding from one end of said tubular housing along an axis of said center electrode, and having an outer circumferential surface along said axis;

a plate ground electrode being arranged at said one end of said tubular housing in a radial direction of said axis and having an end surface confronting said outer circumferential surface of said first bar discharge member; and a second discharge member being arranged on said end surface and having a surface confronting said outer circumferential surface, spark discharge being generated at a gap between said first and second discharge members, wherein if it is assumed that a distance of said gap is G, a width of said outer circumferential surface in a normal direction of a plane including said radial direction and said axis is D, and a width of said surface in said normal direction is A, G is equal to or greater than 0.2 mm and equal to or lower than 0.6 mm, D is equal to or greater than 1.6 mm, and |A–D| is equal to or lower than a result of adding 0.5 mm to G.

2. A spark plug as claimed in claim 1, wherein D is equal to or lower than 5.0 mm.

3. A spark plug as claimed in claim 1, further comprising a weld portion between said one end of said central electrode and said first bar discharge member, wherein a maximum cross-sectional area of said weld portion on a plane perpendicular to said axis is equal to or lower than 8 mm².

4. A spark plug as claimed in claim 1, wherein said one end of said central electrode is welded to a surface of said first bar discharge member on a side of said central electrode.

5. A spark plug as claimed in claim 1, further comprising a weld portion between said one end of said central electrode and said first bar discharge member, said weld portion being provided by laser welding, wherein said weld portion does not confront said surface of said second discharge member, and wherein if it is assumed that a shortest distance between said weld portion and said second discharge member is L, L is equal to or greater than G.

6. A spark plug as claimed in claim 5, wherein L is equal to or greater than a result of adding 0.2 mm to G.

7. A spark plug as claimed in claim 1, wherein each of said first and second discharge members comprises Ir and at least one of Rh, Pt, Ru, Pd, and W.

* * * * *